United States Patent [19]

Nonomura et al.

[11] Patent Number: 4,487,480
[45] Date of Patent: * Dec. 11, 1984

[54] MULTI-LAYER MATRIX TYPE LIQUID CRYSTAL DISPLAY PANEL

[75] Inventors: Keisaku Nonomura; Toshiaki Takamatsu, both of Nara; Hisashi Uede, Yamatokoriyama; Tomio Wada, Ikoma, all of Japan

[73] Assignee: Sharp Kabushiki Kaisha, Osaka, Japan

[*] Notice: The portion of the term of this patent subsequent to Jun. 22, 1999 has been disclaimed.

[21] Appl. No.: 469,782

[22] Filed: Feb. 25, 1983

Related U.S. Application Data

[63] Continuation of Ser. No. 943,871, Sep. 19, 1978, abandoned.

[30] Foreign Application Priority Data

Sep. 22, 1977 [JP] Japan .................................. 52-115308

[51] Int. Cl.³ ................................................ G02F 1/13
[52] U.S. Cl. ..................................... 350/335; 350/333; 350/336
[58] Field of Search ......................... 350/333, 335, 336

[56] References Cited

U.S. PATENT DOCUMENTS

| 3,881,808 | 5/1975 | Gurtler et al. | |
| 3,903,519 | 9/1975 | Zega | |
| 3,936,815 | 2/1976 | Kogure et al. | 350/333 X |
| 3,976,362 | 10/1976 | Kawakami | 350/333 X |
| 4,231,640 | 11/1980 | Funada et al. | 350/336 |
| 4,335,936 | 6/1982 | Nonomura et al. | 350/336 X |

OTHER PUBLICATIONS

Vasil'ev, A. A. et al., "Controlled Phase Transparencies in Coherent—Optical Systems . . . ," *Soviet J. Quantum Electron.*, (Sep. 1977), vol. 7, No. 9, pp. 1089-1093.

*Primary Examiner*—John K. Corbin
*Assistant Examiner*—Richard F. Gallivan
*Attorney, Agent, or Firm*—Birch, Stewart, Kolasch & Birch

[57] ABSTRACT

In a multi-layer matrix type liquid crystal display panel having a stack of a plurality of liquid crystal display cells and matrix electrodes provided for a respective one of the liquid crystal display cells, all supports of the respective liquid crystal display cells are piled sequentially one on top of the other with its longitudinal length longer and its lateral length shorter, than the next sequential top support thereby allowing enough room on all sides for electrode connections.

3 Claims, 7 Drawing Figures

MULTI-LAYER MATRIX TYPE LIQUID CRYSTAL DISPLAY PANEL

This application is a continuation, of copending application Ser. No. 943,871, filed on Sept. 19, 1978, abandoned.

BACKGROUND AND SUMMARY OF THE INVENTION

The present invention relates to a matrix type liquid crystal display panel having orthogonally crossed strip electrodes, namely, matrix electrodes, and more particularly to a panel structure thereof.

For a matrix type liquid crystal display panel, the greater the number of line electrodes, the higher the resolution of a display. With such an increase in the number of the line electrodes, a period of time where a signal is applied throughout a line interval, in other words, a duty ratio is shortened, presenting a crosstalk problem. In the case where a display comprises liquid crystal material, a satisfactory contrast ratio is not available because a threshold voltage level of liquid crystal material is not definite and response thereof is dull. Several approaches to solve these problems have been suggested:

(I) the developement of a new liquid crystal material manifesting definite threshold properties;

(II) a matrix address scheme is designed at the optimum conditions to allow a wide range of an operation margin ($\beta = (V_{on}/V_{off})$; (III) a new electrode layout designed to enhance the resolution of a display. For example, as shown in FIG. 1(a), column electrodes are divided into the upper half $Y_1, Y_2, \ldots Y_n$ and the lower half $Y_1', Y_2', \ldots Y_n'$ while line electrodes $X_1, X_2, \ldots X_m$ are operatively associated in common with the upper and lower halves. An alternative way of FIG. 1(b) is that two adjacent line electrodes $Y_i$ and $Y_j$ are of a comb teeth shape to mesh with each other within a respective one of the line electrodes $X_j$.

Although the first two methods (I) and (II) do not need modifications in the liquid crystal cell structure, it is not possible to increase, remarkably, the number of actuable line electrodes. In contrast, the last method (III) can surely obtain an increased number of actuable or useful line electrodes while suffering from complexity of cell structure.

It is therefore an object of the present invention to provide an improved liquid crystal display panel where an electrode lead scheme is relatively easy to manufacture and handle.

BRIEF DESCRIPTION OF THE DRAWINGS

Other objects and many of the attendant advantages of the present invention will be readily appreciated as the same becomes better understood by reference to the following detailed description which is considered in conjunction with the accompanying drawings, and wherein:

FIGS. 3(a) through 3(c) are diagrams showing one preferred form of a matrix type liquid crystal display panel embodying the present invention, wherein FIG. 3(a) is a plane view, FIG. 3(b) is a cross sectional view taken along the line A—A and FIG. 3(c) is a cross sectional view taken along the line B—B.

DETAILED DESCRIPTION OF THE INVENTION

Figure 1A:
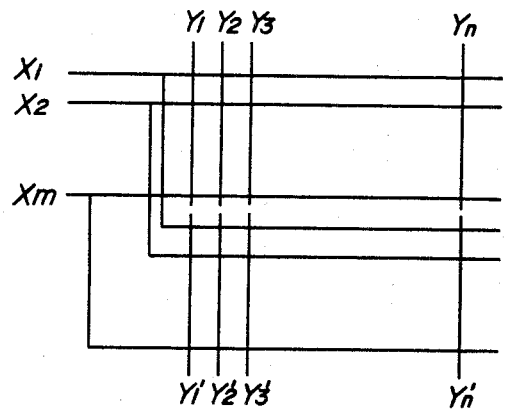
FIGS. 1(a) and 1(b) are diagrams showing a prior art technique to increase the number of scanning electrodes of a matrix type liquid crystal display panel.
Figure 1B:
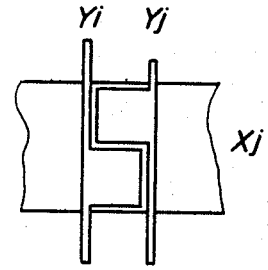

There are two possible types of matrix type liquid crystal display panels capable of implementing the electrode layout shown in FIG. 1(a). One way is to split all the line electrodes into an upper group and a lower group within the same cell structure (the upper and lower division type) and the other way is to pile two liquid crystal cells on the top of each other (the two-layer matrix type). The present invention is interested in the latter type of the two-layer matrix type.

Figure 2:
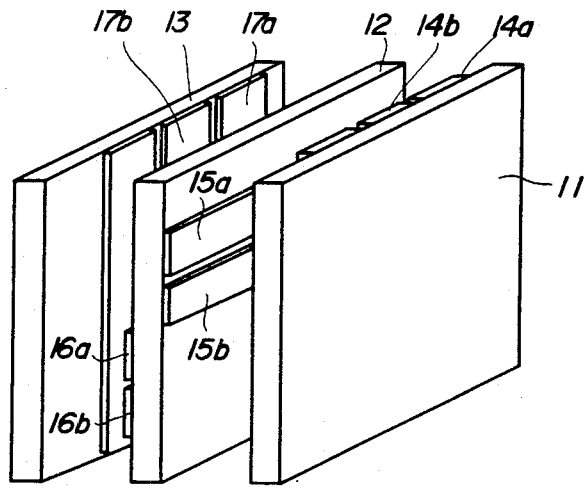
FIG. 2 is a perspective view of a multi-layer matrix type liquid crystal display panel.
Figure 4:
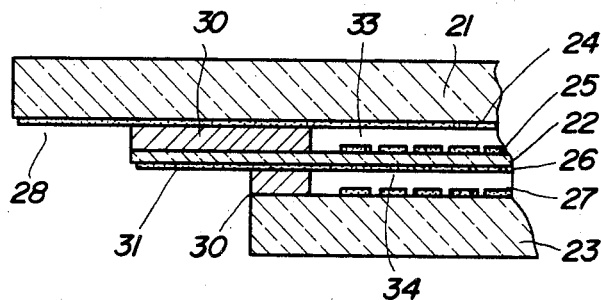
FIG. 4 is an enlarged cross sectional view in part of FIG. 3(c).

As more clearly shown in FIG. 2, the two-layer matrix type comprises, in general, a first transparent support 11, a second transparent support 12 and a third support 13 disposed in the numerical order from the viewing side. While the first support 11 carries column electrodes 14a, 14b, . . . , the second support 12 carries electrodes 15a, 15b, . . . at its upper half facing the first support 11. The second support 12 is further provided with line electrodes 16a, 16b, . . . at its lower half corresponding to the third support 13. The third support 13 carries column electrodes 17a, 17b, . . . Therefore, the two-layer matrix type can offer a duty ratio twice as large as in the other types but have severe inherent problems.

(a). The cell structure is of the two-layer type and causes a parallax. To avoid this, the intermediate support of the three supports shoud be as thin as possible. Though these supports are conventionally made of glass material, a thin and fragile glass plate is rather difficult and dangerous to handle during the manufacture.

(b). The thin glass plate is also difficult and dangerous to handle in leading the line electrodes carried thereon to a driver circuit.

(c). When it is desired to lead the respective electrodes from the opposite edges of the glass plate, alternatively with respect to each other, it is necessary to lead the electrodes from eight points so that there is a possibility of overlapping some electrodes with each other and causing complexity in the electrode lead assembly.

Figures 3A, 3B:
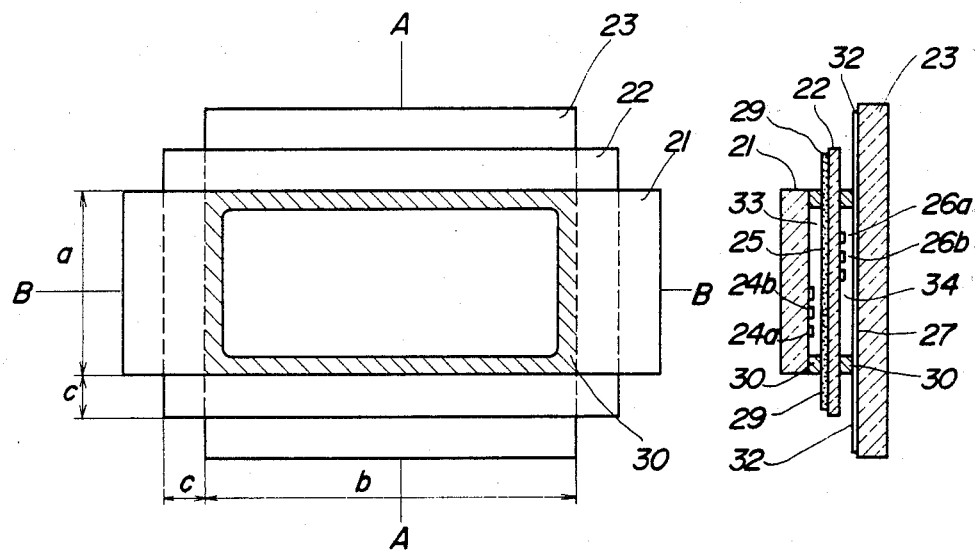
Figure 3C:
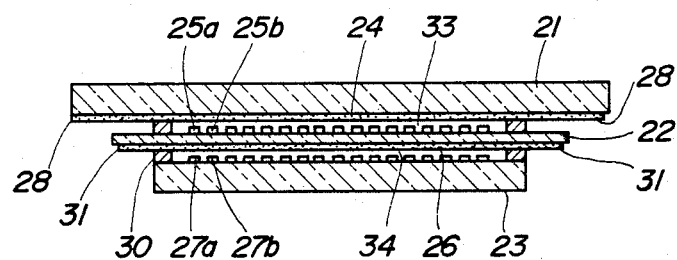

According to the present invention, those packaging problems are overcome by providing an electrode lead assembly as shown in FIGS. 3(a) through 3(c).

Dimensions of the three transparent glass support 21, 22, 23 are selected in accordance with TABLE 1 where a and b are the height and width of a display area (including a seal 30) and c is the width of electrode lead or terminal areas. It will be noted that c is not necessarily equal for all electrode lead areas.

TABLE 1

|   | glass dimension | |
| --- | --- | --- |
|   | height | width |
| glass support 21 | a | b + 4c |
| glass support 22 | a + 2c | b + 2c |
| glass support 23 | 2 + 4c | b |

The glass support 21 is provided with the line electrodes 24a, 24b, . . . only at the lower half thereof. The second support 22 is provided at the viewing side thereof with the column electrodes 25a, 25b, . . . and the upper half of the opposed side thereof with the line electrodes 26a, 26b, . . . . The third and last support 23 carries the column electrodes 27a, 27b, . . . .

The electrode lead areas 28, 28 for the electrode 24 are located at both sides of the lower half of the support 21.

The electrode lead areas 29, 29 for the electrode 25 are located at the top and bottom of the viewing side of the support 22, while the electrode lead areas 31, 31 for the electrode 26 are located at both opposite sides of the upper half of the support 22. The electrode lead areas 32, 32 for the electrode 27 are located at the top and bottom of the support 23.

Since the support 22 is made of an extremely thin glass plate, it is preferable that the four corners of the support 22 be rounded off or the support 22 itself be of the same shape as the remaining supports 21, 23 without protruding therefrom.

Liquid crystal material 33 is injected between the supports 21, 22 to complete the first layer liquid crystal cell and liquid crystal material 34 between the supports 22, 23 to complete the second layer liquid crystal cell.

As a result, the liquid crystal panel of the present invention described above bears the electrode array of FIG. 1(a) in a plane view and takes the form of a two-layer matrix display cell as viewed from FIG. 2 in a cross sectional view.

In summary, the liquid crystal display panel of the present invention comprises a predetermined number of supports disposed sequentially with its longitudinal (or lateral) length thereof longer and its lateral (or longitudinal) length thereof shorter. The intermediate thin glass support is sandwiched between the two thick supports. The electrode lead areas 29 of the thin glass support 22 are in contact with the rear support 23 and the other electrode lead areas 31 in contact with the front support 21. By provision of the seal 30 extending below the electrode lead areas 31, the support 22 can afford the same mechanical rigidity as the supports 21, 23. The support 22 is therefore relieved from destruction or split even if the electrode lead areas 29, 31 are externally connected by means of a flexible sheet or an electrode pin. All of the respective electrode lead areas which are dispersed at the eight different points are never overlapped with respect to each other. It is also possible readily to lead the respective electrodes externally via a flexible sheet, an electrode pin or the like. Although the above embodiment illustrates an example of the two-layer matrix type, the present invention is equally applicable to three or more layered matrix panels.

The invention being thus described, it will be obvious that the same may be varied in many ways. Such modifications are not to be regarded as a departure from the spirit and scope of the invention, and all such modifications are intended to be included within the scope of the following claims.

We claim:

1. A matrix type liquid crystal display panel including an M×N array of display elements arranged across a display area, comprising:
   first support means, generally planar and for supporting first plurality of electrodes numbering M extending thereacross in a first direction;
   second support means arranged generally parallel to said first support means and spaced apart therefrom for supporting a second and third plurality of electrodes, said second support means having first and second support surfaces,
   said first support surface generally facing said first support means and having a second plurality of electrodes extending across said first support surface in a second direction substantially orthogonal to said second direction, said first plurality of electrodes numbering $\frac{1}{2}$ N and being substantially equispaced across half the display area;
   said second support surface having a third plurality of electrodes numbering M extending thereacross in said first direction;
   third support means arranged generally parallel to said second support means and spaced apart therefrom, said third support means supporting a fourth plurality of electrodes extending thereacross in said second direction, said fourth plurality of electrodes numbering $\frac{1}{2}$ N and being substantially equispaced across the half of said display area not having said second plurality of electrodes arranged thereacross;
   a liquid crystal material disposed between said first and second substrates and between said second and third substrates;
   the size in said first direction of said first support means being longer than the size of said second support means in that direction which in turn is longer than the size of said third support means in said first direction;
   the size in said second direction of said first support means being shorter than the size of said second support means in that direction which in turn is shorter than the size of said third support means in said second direction;
   the sizing of said first, second and third support means exposing the ends of said electrodes to facilitate simplified connection to said electrodes.

2. The matrix display of claim 1 wherein said first plurality of electrodes and said third plurality of electrodes are substantially equispaced across the entire display area.

3. The matrix display of claim 2 wherein said second support means has a thickness which is less than the thickness of either said first or third support means.

* * * * *